US007640721B2

(12) United States Patent
Viaud et al.

(10) Patent No.: US 7,640,721 B2
(45) Date of Patent: Jan. 5, 2010

(54) TRACTOR AND BALER COMBINATION WITH AUTOMATIC BALING AND STEERING CONTROL

(75) Inventors: Jean Viaud, Gray (FR); Claude Julien, Gray (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/122,986

(22) Filed: May 19, 2008

(65) Prior Publication Data

US 2008/0224445 A1 Sep. 18, 2008

Related U.S. Application Data

(62) Division of application No. 11/344,447, filed on Jan. 31, 2006, now Pat. No. 7,404,355.

(51) Int. Cl.
*A01D 39/00* (2006.01)
*A01D 43/02* (2006.01)
*A01D 75/00* (2006.01)

(52) U.S. Cl. ...................................... 56/341
(58) Field of Classification Search .......... 701/50, 701/17, 81, 200, 83, 210, 205, 209; 53/399, 53/587, 589, 504, 430; 100/47, 87, 88, 4, 100/43, 100, 215, 45; 280/442; 56/341, 56/10.2 E, 10.2 F, 344
See application file for complete search history.

(56) References Cited

U.S. PATENT DOCUMENTS

| 3,952,828 A | * | 4/1976 | Stampfer et al. ........... 56/10.2 F |
| 4,065,914 A | * | 1/1978 | Phillips et al. ................. 56/341 |
| 4,224,867 A | * | 9/1980 | Gaeddert et al. .............. 100/88 |
| 4,433,533 A | * | 2/1984 | Giani ........................... 56/341 |
| 4,517,795 A | * | 5/1985 | Meiers ........................ 56/341 |
| 4,630,191 A | * | 12/1986 | Strosser ....................... 700/81 |
| 4,686,820 A | * | 8/1987 | Andra et al. .................. 56/341 |
| 4,702,066 A | * | 10/1987 | Newendorp et al. ........... 56/341 |
| 4,748,802 A | * | 6/1988 | Strosser et al. ................ 56/341 |

(Continued)

FOREIGN PATENT DOCUMENTS

EP 1685759 8/2006

(Continued)

OTHER PUBLICATIONS

European Search Report, Feb. 10, 2009, 6 Pages.

*Primary Examiner*—Árpád Fábián-Kovács

(57) ABSTRACT

A tractor comprises a tractor frame, driven ground engaging device, and an electronic tractor controller. A baler comprises a baler frame coupled or connected to the tractor frame, a crop receiving device, a baling chamber, a bale size sensor associated with the baling chamber, and an electronic baler controller. The baler controller is operable to submit a halt signal to the tractor controller when a bale size signal provided by the bale size sensor indicates that a bale has reached a size equal to or exceeding a first predetermined size. The tractor controller is operable to command the ground engaging means to automatically halt the tractor when receiving a halt signal from the baler controller. A steering controller is connected to a swath position sensor and operable to automatically steer the tractor along a swath based upon the signals of the crop swath sensor and of the bale shape sensor such that a uniform bale shape is obtained.

6 Claims, 4 Drawing Sheets

U.S. PATENT DOCUMENTS

| | | | | |
|---|---|---|---|---|
| 4,850,271 A | * | 7/1989 | White et al. | 100/88 |
| 4,855,924 A | * | 8/1989 | Strosser et al. | 700/117 |
| 4,924,405 A | * | 5/1990 | Strosser et al. | 700/17 |
| 5,165,332 A | * | 11/1992 | Lee | 100/88 |
| 5,408,817 A | * | 4/1995 | Wagstaff | 56/341 |
| 5,444,969 A | * | 8/1995 | Wagstaff et al. | 56/341 |
| 5,551,218 A | | 9/1996 | Henderson et al. | |
| 5,615,544 A | * | 4/1997 | Berger et al. | 56/341 |
| 5,666,792 A | * | 9/1997 | Mullins | 56/10.2 A |
| 5,715,665 A | * | 2/1998 | Diekhans et al. | 56/10.2 F |
| 5,715,666 A | * | 2/1998 | Huster et al. | 56/10.2 F |
| 5,911,669 A | * | 6/1999 | Stentz et al. | 56/10.2 F |
| 5,928,309 A | * | 7/1999 | Korver et al. | 701/214 |
| 5,935,183 A | * | 8/1999 | Sahm et al. | 701/50 |
| H1819 H | * | 12/1999 | Anderson et al. | 56/341 |
| 6,101,795 A | * | 8/2000 | Diekhans | 56/10.2 F |
| 6,389,785 B1 | * | 5/2002 | Diekhans et al. | 56/10.2 F |
| 6,615,570 B2 | * | 9/2003 | Beck et al. | 56/10.2 E |
| 6,874,412 B1 | * | 4/2005 | Glaszcz et al. | 100/47 |
| 7,155,888 B2 | * | 1/2007 | Diekhans | 56/10.2 R |
| 7,222,566 B2 | * | 5/2007 | Biziorek | 100/87 |

FOREIGN PATENT DOCUMENTS

WO    WO 2007/031093     3/2007

* cited by examiner

TRACTOR AND BALER COMBINATION WITH AUTOMATIC BALING AND STEERING CONTROL

CROSS-REFERENCE TO RELATED APPLICATION

This application is a division of applicant's application U.S. Ser. No. 11/344,447, filed 31 Jan. 2006 now U.S. Pat. No. 7,404,355 and titled TRACTOR AND BALER COMBINATION WITH AUTOMATIC BALING AND STEERING CONTROL.

FIELD OF THE INVENTION

The present invention relates to a tractor/baler combination.

BACKGROUND OF THE INVENTION

A tractor/baler combination is used in agriculture to take up crop lying or standing on a field and to press and bind it to a bale. An operator sits at an operator station of the tractor and steers the tractor along the crop. Usually, a baler monitor or a reconfigurable display connected to a bus system is located within the field of view of the operator. The operator has to look at the monitor or display at regular intervals, since it displays information on the actual state of the baler.

In the prior art, the operator also has to obey a number of actions displayed to him or her on the display or monitor, although a number of baler functions have been automated recently, like opening and closing rear doors of the baler to allow a bale to eject. One of these actions is to stop the driving motion of the tractor once a bale is ready to be bound with twine or wrapped with net or sheet material, in order to stop additional crop from entering the baling chamber that would disturb the binding or wrapping action.

Automatic systems have been proposed for controlling the propelling speed of the tractor in a manner such that a desired crop throughput is obtained. They still rely on the operator to stop the tractor once a bale is to be bound or wrapped.

Another duty of the operator is to steer the tractor along the swath. Automatic steering systems recognizing the swath using a video camera and an image processing system or a scanning laser sensor detecting the contour of the swath have been proposed, but they attempt to drive along the center of the swath. This leads to a barrel shaped bale with less crop material at the edges than at its center due to the shape of the swath. Sensors for the shape of the bale have been proposed that give steering information to the operator, but they still rely on a manual steering operation.

The described duties are fatiguing for an operator who has driven and controlled the tractor/baler combination for a longer time. It is thus an object of the present invention to provide a tractor/baler combination with additional automatic functions that make work for the operator less fatiguing.

SUMMARY OF THE INVENTION

According to a first aspect of the invention, a combination of a tractor and a baler connected or coupled to or integrated into the tractor (as a self propelled baler) is provided. The tractor comprises a frame and ground engaging means supporting the frame upon the ground. The ground engaging means can be wheels or belts and are connected directly or via a drive train to an engine or motor, such that they can be driven to propel the tractor at least in a forward direction over a field. An electronic tractor controller is arranged to command the propelling speed of the tractor. The (round or rectangular) baler comprises a frame, a baling chamber mounted on the frame and a crop receiving means for collecting or receiving crop lying or standing upon a field and conveying the crop into the baling chamber. A bale size sensor detecting the size of the bale baled in the baling chamber is connected to an electronic baler controller. The baler controller can be provided on the baler or on the tractor. When the bale size sensor detects that the size of the bale reaches or exceeds a first predetermined size, thus indicating that it is at the time to tie twine around the bale or to wrap it with net or foil, and hence no additional crop material should be introduced into the baling chamber, the baler controller sends a halt signal to the tractor controller. The tractor controller then commands the ground engaging means to halt, without an operator interaction.

In this manner, work of the operator is made easier since he does not need to observe a monitor or display indicating him to stop the tractor. Production of bales that are larger than desired is thus avoided.

The tractor is preferably decelerated or brought to a speed lower than during baling, as soon as the bale reaches or exceeds a second size that is somewhat smaller than the first size. Due to the deceleration, an abrupt stopping or braking is avoided when the bale reaches the first size.

In a preferred embodiment, the baler is a round baler and comprises a wrapping material dispenser that ejects or dispenses a twine, net or sheet to the bale upon a command of the baler controller. This command is given once the bale size sensor submits a signal indicating that the bale size exceeds the first size. The ground engaging means are only halted once a wrapping material movement sensor indicates that the wrapping material is caught and hence pulled by the bale. The invention could however also be used on a rectangular baler in order to stop the tractor when the bale is bound with a tine or wrapped with a net or sheet.

The tractor controller can control the ground engaging means to propel the tractor automatically with a speed yielding a desired baler throughput. The throughput can be measured by detecting the torque at a PTO (power take off) of the tractor driving the baler or with a sensor detecting the thickness of a crop layer received by the baler or with a sensor measuring the torque for driving the crop receiving means. After a bale has been ejected, it is proposed to await a resume baling operation signal that is to be input by an operator into a user interface connected to the tractor controller, before the ground engaging means of the tractor are set into motion again. This operator input has security advantages, since the operator can check whether the baler and tractor combination is in a condition appropriate to build a new bale before the operation resumes.

It is further proposed that the baler has a door for ejecting the bale. An actuator of the door is only activated and the bale is only ejected after the operator has input a bale ejection signal to a user interface. One thus avoids that a bale is ejected under unsuitable conditions, e. g. on uneven ground. The door is automatically closed only when a bale pass sensor has submitted a signal to the baler controller indicating that the bale has passed the door. Resumption of the baling operation is also only possible when the door is closed, since otherwise a resume baling operation signal would be ignored by the baler controller.

The baler comprises a number of elements and actuators that need to be brought into a suitable position or operation mode before a baling operation is started or resumed after a bale ejection. Examples are a tensioning system of aprons surrounding the baling chamber, a door actuator, a position control means of the crop receiving means, and a PTO of the tractor. It is proposed to put them automatically into the suitable position or operation mode or to wait until the operator has done it, preferably after he has obtained a suitable hint on a user interface, and to enable a start of the driven ground engaging means of the tractor for a baling operation only when they are all in a suitable position or operating mode, and when the operator has confirmed to continue baling.

According to a second aspect of the invention, there is provided a combination of a tractor and a baler, wherein the tractor comprises: a tractor frame, ground engaging means supporting the tractor frame upon the ground, steering means for steering the tractor and an electronic tractor steering controller operable to control the steering means, the baler comprises: a baler frame coupled or connected to the tractor frame, a crop receiving means supported on the baler frame for receiving crop from a field, a baling chamber supported on the baler frame for pressing crop received by the crop receiving means to a bale, a bale shape sensor associated with the baling chamber for detecting the shape of a bale within the baling chamber, and an electronic baler controller connected to the bale shape sensor, the baler controller connected to the steering controller, wherein the steering controller is connected to a swath sensor and operable to automatically steer the tractor along a swath based upon the signals of the crop swath sensor and of the bale shape sensor such that a uniform bale shape is obtained. The tractor is thus automatically driven along a swath, trying to get a uniform bale shape and density and to pick all crop from the ground.

DESCRIPTION OF THE PREFERRED EMBODIMENT

Figure 1:
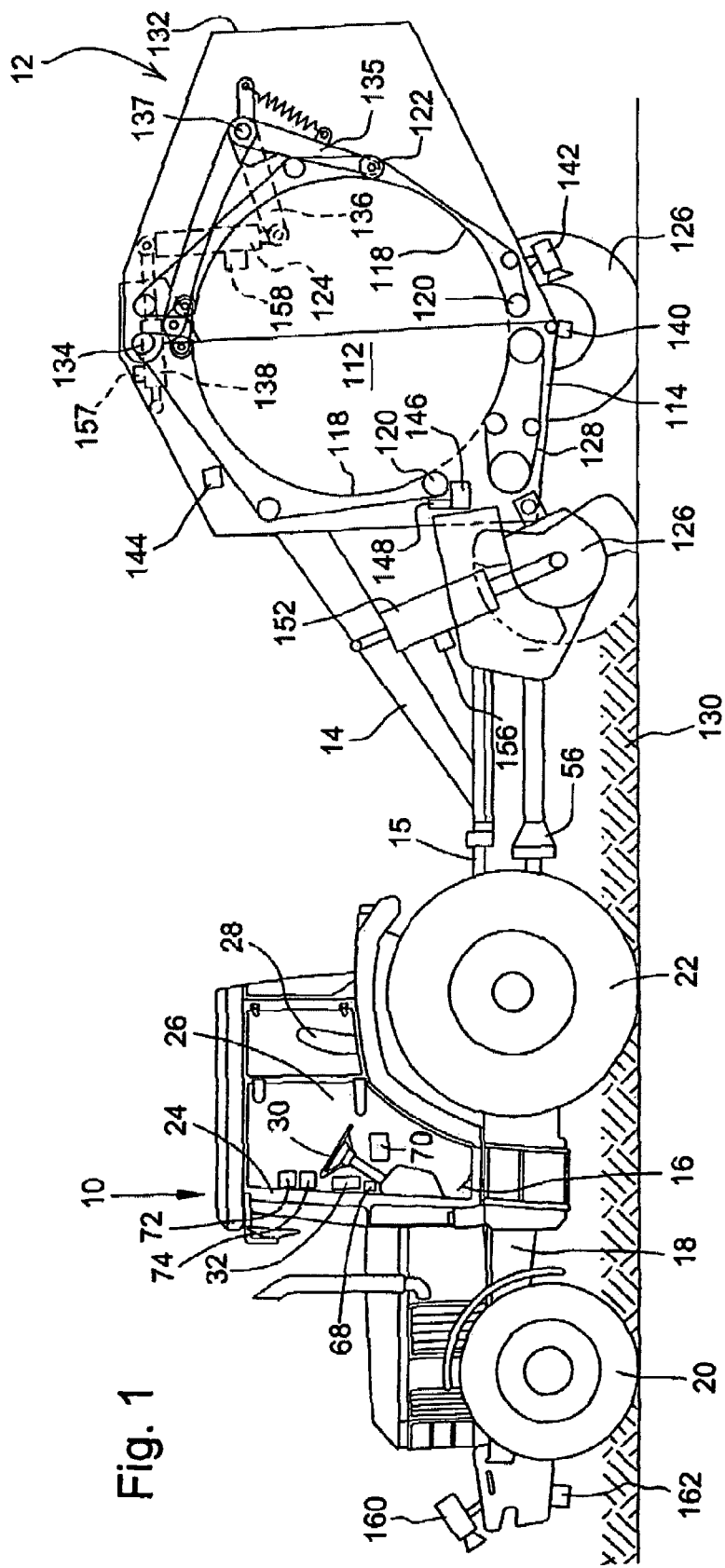
FIG. 1 is a lateral view of an tractor with a round baler.

FIG. 1 shows a lateral view of tractor 10 and a round baler 12 coupled to a drawbar hitch 15 of the tractor 10 by means of a drawbar 14. The tractor 10 is supported on a frame 18, which is supported on steerable front wheels 20 and movable rear wheels 22 serving as ground engaging means, and supports a cabin 24 wherein the operator's workstation 26 is located. In the following, direction indications as front and rear, left and right, are given with respect to the normal forward direction of the tractor 10 that goes in FIG. 1 to the left.

Tractor

The operator's workstation 26 includes a seat 28, a steering wheel 30, a gas pedal 16, and another pedal for the brake and clutch (not shown), and input elements arranged in the operator's workstation 26 within reach of the operator for setting the selectable functions of the tractor 10. The latter includes a selection device 32 for the transmission gear of a power take-off shaft gearbox 46, a hand throttle lever 70, a power take-off switch 68, an input device 74 for setting a target torque value at the PTO output shaft 56, and a virtual terminal 72 of a bus system that operates according to ISO 11783 with a keyboard 90 and a display device 94 (see FIG. 2). The selection device 32, the input device 74, and/or the power take-off switch 68 could also be implemented as menu items on the terminal 72. Instead of the terminal 72, any other input and display devices may be used. The gas pedal 16 is provided with a sensor that transmits electrical signals to an operator interface logic unit 64, the electrical signals containing information on the particular position of the gas pedal 16.

Figure 2:
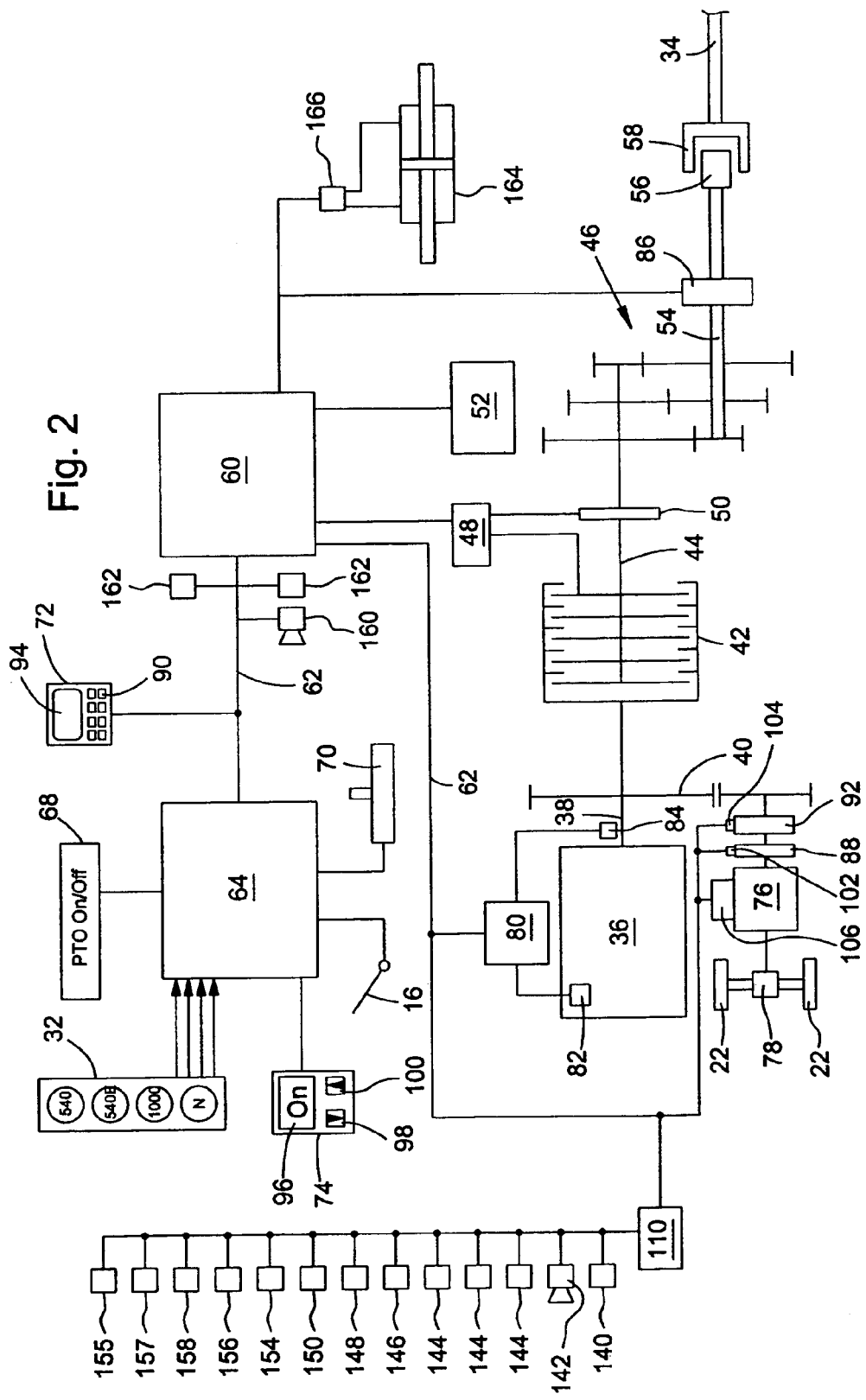
FIG. 2 is a schematic representation of the drive assembly of the tractor.

FIG. 2 schematically illustrates the drive assembly of the tractor 10 for driving the rear wheels 22 and a power take-off shaft 34 used for driving movable elements of the baler 12. A driving engine 36, usually a diesel engine, drives a shaft 38, which, via a gearwheel 40, is used to drive the rear wheels 22 and preferably also the front wheels 20, and, if necessary, other movable devices of the tractor 10, such as an air conditioning compressor and a power generator. The rear wheels 22, and the front wheels 20, are driven by the gearwheel 40 via a clutch 88 and a drive transmission with continuously variable transmission ratios, or with stepwise selectable ratios, but constant within the individual transmission stages, and a differential 78.

The drive transmission can, for example, be a purely hydraulic transmission with a hydraulic pump driven by the clutch 88 and a hydraulic motor or hydrostatic transmission moving the wheels, wherein the transmission ratio of the gear can be changed by adjusting the swash plates of the pump and/or of the engine. In another embodiment, it is a multistage mechanical gearbox with a torque converter connected in series, such as used in passenger cars, or a mechanical gearbox with a sufficient number of transmission stages and an automatically switched clutch or planet gears and friction clutches. Also conceivable is the use of a drive transmission with step-less adjustable gearing, which for instance, works with V-belts that rotate around pulleys with adjustable diameters, or with a mechanical and a hydraulic (or electrical) drive path, wherein a planetary transmission comprises an element driven mechanically with a fixed or stepwise variable speed and one driven hydraulically or electrically with variable speed, and the third element is used for output. A combination of several of the mentioned transmissions would also be conceivable.

In the illustrated embodiment, the drive transmission comprises a power shift transmission 92, which contains planetary gear sets with clutches and brakes that facilitate the changeover of speeds under load, and a secondary, manually shifted, or synchromesh, transmission 76. The power shift transmission 92 and the synchromesh transmission 76 are provided with actuators, 104 and 106 respectively, for selecting the transmission stage. Since both actuators 104 and 106 are controllable independently of one another, a high number of different transmission stages are available, derived by multiplying the number of transmission stages of the power shift transmission 92 with the number of transmission stages of the synchromesh transmission 76. Further inserted in the drive train between the power shift transmission 92 and the synchromesh transmission 76 is a clutch 88, which is movable through a clutch actuator 102 between a closed and open position.

The shaft 38 is also connected to a hydraulically operable clutch 42, which is connected to the output with an input shaft 44 of a power take-off gearbox 46. The clutch 42 is actuated by means of an electromagnetic valve assembly 48, which is also connected to a brake 50 positioned on the input shaft 44.

The power take-off gearbox 46 has three different, selectable transmission stages and therefore comprises three meshing gearwheel pairs. The transmission stage is selected by means of an electro-hydraulic (or electrical) actuator 52. Movable clutch elements determine which of the three gearwheels arranged on a driven shaft 54 of the power take-off gearbox 46 is in positive torque connection with the driven shaft 54. Alternatively, the actuator 52 could establish which of the three gearwheels arranged on the input shaft 44 is in positive torque connection with the input shaft 44. The actuator 52 enables the selection of three transmission stages. In the illustrated embodiment, a first transmission stage provides, at a nominal driving engine speed of 2100 rpm, a driven shaft speed of 1000 rpm. A second transmission stage, at a lowered driving engine speed of 1800 rpm, the driven shaft speed is 540 rpm. A third transmission stage, at a nominal driving engine speed of 2100 rpm, the driven shaft speed is 540 rpm. Moreover, it is possible to not couple any of the gearwheels of the power take-off gearbox 46 with the input shaft 44 and the driven shaft 54, thereby placing the power take-off gearbox 46 into a neutral position, wherein the driven shaft 54 is freely rotatable, even when the brake 50 is activated.

The driven shaft 54 is connected to a power take-off output shaft 56 in the form of a power take-off stub shaft. The power take-off shaft 34 of the baler 12, equipped with a sleeve shaft end piece 58, is slid onto the power take-off stub shaft. The power take-off shaft 34 is normally designed as a universal-joint propeller shaft.

An electronic tractor controller 60 is connected to the valve assembly 48 and to the actuator 52. Moreover, the electronic tractor controller 60 is connected to an operator interface logic unit 64 by means of a device bus 62 (e.g., CAN bus), which is connected to the selection device 32, the input device 74, the gas pedal 16, the hand throttle lever 70, and the power take-off switch 68. The tractor controller 60 is moreover connected by the bus 62 to the virtual terminal 72, the actuators 104 and 106, and the clutch actuator 102 of the clutch 88. The selection device 32 comprises four pushbuttons, which are respectively assigned to the previously mentioned three transmission stages and to the neutral position of the power take-off gearbox 46.

The selection device 32 makes it easy for the operator, through manual operation of the four pushbuttons, to select one of the three transmission stages of the power take-off gearbox 46 or the neutral position. The user interface logic unit 64 transmits information on the operator's setting via the bus 62 to the tractor controller 60, which controls the actuator 52 in accordance with the information received. Each transmission stage selected may be displayed to the operator by illuminating the assigned pushbutton of the transmission stage selection device 32.

If the operator puts the power take-off switch 68 into the operating position, the operator interface logic unit 64 transmits the corresponding information, via the bus 62, to the tractor controller 60, which prompts the valve assembly 48 to release the brake 50 and to engage the clutch 42. If the operator puts the power take-off switch 68 into the non-operating position, the operator interface logic unit 64 analogously transmits corresponding information, via the bus 62, to the tractor controller 60, which prompts the valve assembly 48 to disengage the clutch 42 and to activate the brake 50.

The tractor controller 60 is connected, via the bus 62, to an engine controller 80, which in turn controls an injection assembly 82 of the engine 36 and to which information about the respective speed of the shaft 38 is fed by a speed sensor 84. A sensor 86 connected to the tractor controller 60 determines the torque transmitted by the driven shaft 54. The speed sensor 84 may optically (through perforated rotary encoder discs connected to the shaft 38) or magnetically (through magnets connected to the shaft 38, which work together with induction coils, reed relays or hall sensors) interact with the associated shaft 38 to determine the speed. The speed may also be determined by other suitable means. The sensor 86 comprises strain gauges positioned on the driven shaft 54, whose terminals are connected to the tractor controller 60 by means of sliding contacts, in order to determine the elastic torsion of the driven shaft 54 caused by the transmitted torque. Any other embodiments of the sensor 86 may be used, for instance, laser sensors for determining the torsion of the driven shaft 54.

The third input device 74 comprises three keys 96, 98 and 100. The first key 96 is used to switch on an automatic mode of operation and the other keys 98, 100 to reduce (key 98) or enlarge (key 100) the target torque value at the driven shaft 54.

In operation, the tractor controller 60 instructs the engine-actuated control 80 to let the driving engine 36 run at a speed that corresponds to the current input of the selection device 32, i.e., depending on the pressed key of the selection device 32, with a fixed speed of 2100 rpm or 1800 rpm. Alternatively, the speed is entered by the operator via a torque input device (not shown) or via the virtual terminal 72. If the neutral position is selected, the torque of the driving engine 36 will depend on the position of the gas pedal 16 or of the hand throttle lever 70, or is entered by the operator, or is pre-set.

Baler

Referring again to FIG. 1 and also to FIG. 2, the baler 12 comprises a baler frame 114 supported on wheels 116. The frame 114 supports a baling chamber 112 surrounded by aprons 118 guided around rollers 120. An arm 135 supporting a roller 122 can be moved upwardly and downwardly by means of a hydraulic cylinder 124. The hydraulic cylinder 124 is connected to the arm 135 via a lever 136 that is pivotally mounted at a horizontal axis 137. The hydraulic cylinder 124 thus defines the tension of the aprons 118. Below the front edge of the baler 12, a crop receiving means 126 in the form of a pickup with tines moving or rotating around a transverse axis followed in a crop flow direction by a conveyor belt 128 is located. The conveyor belt 128 could also be replaced by a rotor (not shown), or a rotor could be inserted in the crop flow direction between the crop receiving means and the conveyor belt 128. Instead of the pickup, any other suitable crop receiving means could be used, like mowing and conveying units. The crop receiving means 126 collects crop lying in a swath 130 of grass, hay or straw on the field and feeds it into the baling chamber 112. The aprons 118 define a baling chamber 112 of a variable size. The aprons 118 are set into motion in their longitudinal direction during a baling process, since one or more of the rollers 120 is rotatively driven. The crop introduced into the baling chamber 112 is thus also rotating during baling, while the size of the baling chamber 112 increases over time since the bale causes arm 135 to move downwardly against the force of the cylinder 124.

A rear door 132 is pivotally mounted to the frame 114 at an axis 134 extending transversely to the forward direction of the tractor 10 and the baler 12 located on the roof of the baler 12. A door actuator 138 in the form of a hydraulic cylinder is mounted with one end to the frame 114 and with a second end to the rear door 132. The rear door 132 supports the rollers 120 surrounding the rear part of the baling chamber 112. Actuator 138 is connected to the rear door 132 such that it can pivot the rear door 132 upwardly (in FIG. 1 counter-clockwise) around axis 134 to be able to eject a bale from the baling chamber.

On board of the baler 12, a baler controller 110 is provided. The baler controller 110 is connected to the tractor controller 60 (shown in FIG. 2) via bus 62 by means of a cable with a releasable plug connected to a socket at the rear of the tractor frame 18 or via a radio connection. The baler controller 110 is additionally connected to a number of sensors and actuators.

A rear door sensor 140 connected to the baler controller 110 is mounted at the lower rear end of the baler frame 114 close to the lower front edge of the rear door 132 and is sensing whether the rear door 132 is closed or not by means of a switch actuated by the rear door 132.

A rear camera 142 is mounted to the lower rear face of the rear door 132. It is connected to the baler controller 110. The rear camera 142 provides video signals that can be displayed on the display device 94 (shown in FIG. 2) such that the operator can watch whether a bale is properly ejected. The signals of the rear camera 142 are additionally processed in an image processing system provided inside of or external to the baler controller 110 to provide an electronic indication whether a bale was properly ejected from the baling chamber 112.

Three bale size sensors 144 connected to the baler processor 110 are distributed over the width of the baling chamber 112. They sense the distance to the surface of the bale and/or of aprons 118 abutting the bale surface and provide thus information about the bale diameter at their respective location along the width of the bale. A first one of the bale size sensors 144 is assigned to a position close to the left edge of the baling chamber 112. A second one of the bale size sensors 144 is assigned to a position close to center of the baling chamber 112. A third one of the bale size sensors 144 is assigned to a position close to the right edge of the baling chamber 112. The bale shape detected by the bale size sensors 144 can be permanently displayed to the operator on the display device 94.

A wrapping material dispenser 146 is located close to the baling chamber 112. It is connected to the baler controller 110 and dispenses, once instructed so by the baler controller 110, a wrapping material like twine, ribbon, net or wrapping sheet to the baling chamber 112. The rotating bale catches or pulls the wrapping material such that it is then wrapped around the bale. A wrapping material movement sensor 148 is interacting with the wrapping material dispenser 146 and senses whether the bale is pulling the wrapping.

The crop receiving means 126 can be lifted by a hydraulic cylinder 152 that is controlled via an electromagnetic valve assembly 150 controlled by the baler controller 110. Another electromagnetic valve assembly 154 is controlling the hydraulic cylinder 124. The door actuator 138 is controlled by a third valve assembly 155. The hydraulic fluid for controlling the hydraulic cylinders 124, 152 and the door actuator 138 is provided by the hydraulic system of the tractor 10. Sensors 156 and 158 assigned to the cylinders 152 respectively 124 provide information about the position of the cylinders 152, 124 to the baler controller 110. Another sensor 157 senses the position of the door actuator 138 or of the door 132.

At the front of the tractor 10, a camera 160 viewing upon the swath 130 is mounted. The camera 160 provides a video signal to the tractor controller 60 that is processed in an image processing system provided inside of or external to the tractor controller 60 to provide an electronic indication about the location of the tractor 10 with respect to the swath.

Automatic Baling Operation

Figure 3:
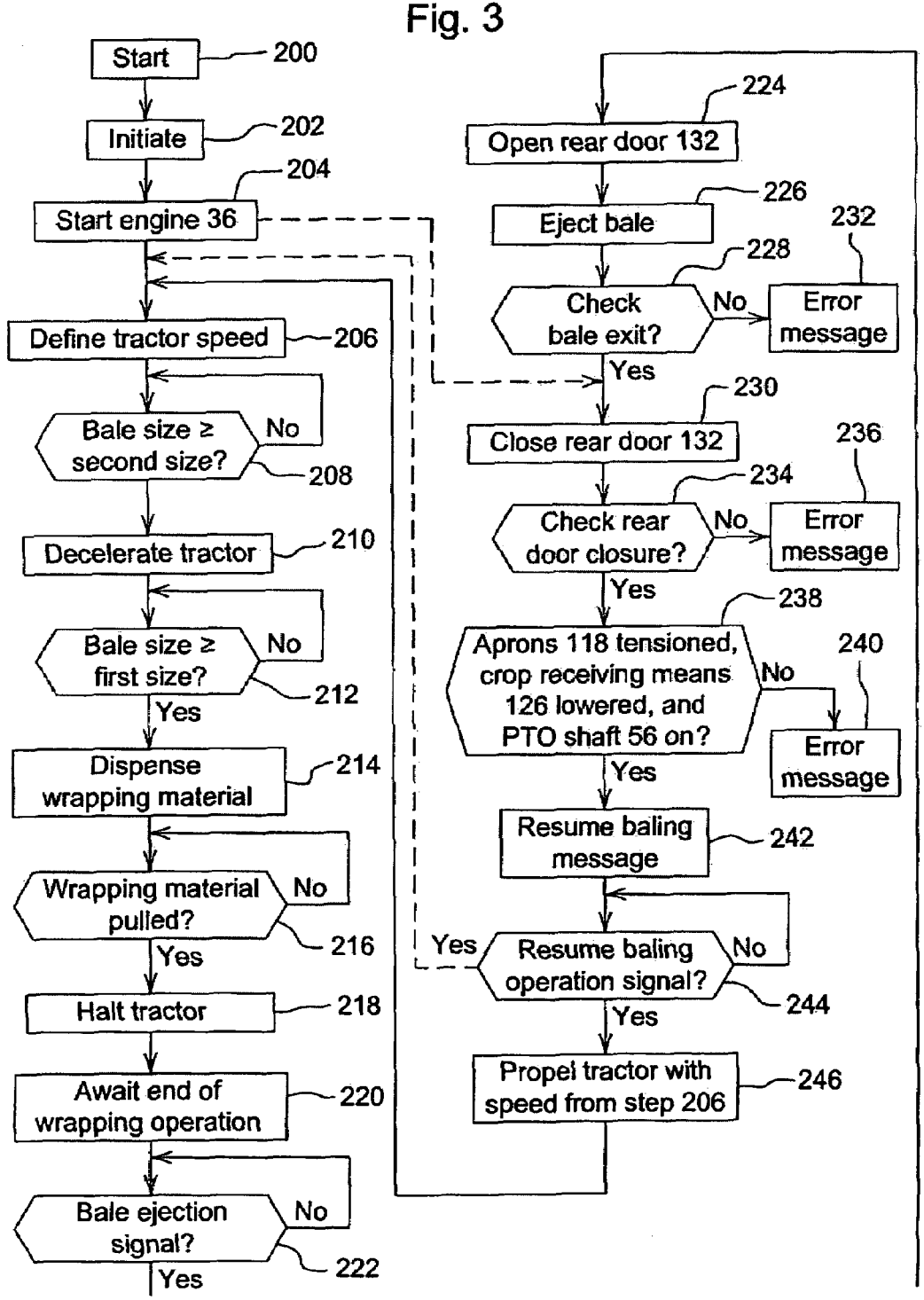
FIG. 3 is a flow chart of a program under which the controllers operate when bales are produced; and, FIG. 4 is a flow chart of a program under which the tractor controller automatically steers the tractor.

In FIG. 3, a flow diagram schematically indicates how the shown tractor baler combination can be operated according to an embodiment of the invention. After start in step 200, the tractor controller 60 and the baler controller 110 are initiated, i.e. suitable software is loaded into their memories at step 202. In step 204, the engine 36 is started once the operator turns an ignition key or depresses a designated key.

Then, in step 206 a desired tractor speed is defined. In a preferred embodiment, the propulsion speed of the tractor 10 is initially specified by the gas pedal 16 or the hand throttle lever 70. The tractor controller 60 then controls the actuators 104 and 106 and, before and after operating the actuator 106, the clutch actuator 102 for disengaging and engaging the clutch 88, so that the drive transmission drives the wheels 22 at the desired speed. The torque at the driven shaft 54, measured by the sensor 86, is displayed on the display device 94 of the virtual terminal 72. As soon as the displayed torque corresponds to a target torque value that is optimal and appropriate for the attachment 12, the operator can operate the key 96 of the input device 74. The tractor controller 60 then ignores the inputs from the gas pedal 16 or the hand throttle lever 70, and by operating the actuators 104 and 106, adjusts the propulsion speed of the machine 10 such that the torque measured by the sensor 86 at least approximately corresponds to the target torque value. Key 98 facilitates a step-by-step decrease of the target torque value and key 100 facilitates a step-by-step increase of the target torque value, e.g., in increments of 10 Nm. Alternatively, or in addition, the desired target torque value may be entered via the keyboard 90 of the virtual terminal 72 as a numerical value. Furthermore, the manufacturer and type of attachment 12 may be entered via the keyboard 90 and the control unit 90 derives the target torque value therefrom using a database. The target torque value can also be stored in memory, connected to the bus 62, on board the attachment 12, and the tractor controller 60 obtains it from the memory 108 as needed.

In step 208, the baler controller 110 evaluates the signals from the three bale size sensors 114 and investigates whether any one of them indicates that the bale size is larger than a second bale size. This second bale size is slightly (e.g. 10 cm in diameter) smaller than a first bale size corresponding to a desired bale size input by the operator by means of the keyboard 90. If the second size has not been reached, step 208 is performed again.

On the other hand, if the bale size is equal to or larger than the second size, step 210 is executed, in which the baler controller 110 sends a deceleration signal to instruct the tractor controller 60 to decelerate the tractor 10 and to drive it with a certain, relatively small speed (e.g. 4 km/h).

In following step 212, the baler controller 110 again evaluates the signals from the three bale size sensors 114 and investigates whether any one of them indicates that the bale size is larger than the first bale size. If the first size has not been reached, step 208 is performed again.

On the other hand, if the bale size is equal to or larger than the first size, step 214 is executed, in which the baler controller 110 instructs the wrapping material dispenser 146 to dispense a wrapping material to the bale. If necessary or useful, the crop receiving means 126 could be lifted by the cylinder 152 upon command of the baler controller 110 before the wrapping material dispenser 146 is operated. Step 216 follows, in which the baler controller 110 checks according to the signals provided by the wrapping material movement sensor 148 whether the bale has caught and thus pulls the wrapping material. If this is not true, step 216 is performed again, otherwise step 218 is performed, in which the baler controller 110 sends a halt signal to the tractor controller 60 which then stops the tractor. Step 220 follows, in which the wrapping operation is performed and its end is awaited. An error signal is submitted from the baler controller 110 to the display 94 when the wrapping material movement sensor does not submit a signal to the baler controller 110 indicating that the wrapping material is pulled by the bale after the baler controller 110 has commanded the wrapping material dispenser 146 to dispense a wrapping material.

Thereafter, in step 222 a bale ejection signal to be input via keyboard 90 is awaited from the operator, after a corresponding message has been displayed via display device 94 or brought acoustically to the operator's attention. The operator has thus the chance to bring the tractor 10 and baler 12 into another position when the actual position is not suited to eject a bale, e.g. on uneven terrain. Once the bale ejection signal is received, step 224 is executed in which the baler controller 110 instructs the valve assembly 154 controlling the hydraulic cylinder 124 to untension the aprons 118 and commands the valve assembly 155 to actuate the door actuator 138 to open the rear door 132. Then, in step 226 the bale is ejected by gravitation, since a support of the lower rear parts of the bale by the rear door 132 is lacking. Additionally, it would be possible to drive the conveyor belt 128 below the baling chamber 112 by means of a clutch controlled by the baler controller 110 in a clockwise direction to eject the bale. If there would be a rear ramp at the exit of the baler 12, it could also be lowered under control of the baler controller 110.

In step 228, it is checked based upon the video signals from the camera 142, whether the bale has been properly ejected from the baling chamber 112.

If the bale has, according to the video signals, indeed exited the baling chamber 112, step 230 is performed in which the valve assembly 155 controlling the door actuator 138 is instructed to close the door 132. Otherwise an error message is displayed to the operator at step 232. After step 230, the baler controller 110 checks in step 234 whether the rear door sensor 140 indicates that the rear door 132 has been closed. If this is not true, step 236 is performed in which an error message is displayed to the operator. The door position could also be checked based upon the signals of sensor 157, the door sensor 140 can thus be omitted. On the other hand, if the door 132 is closed, step 238 follows in which the baler controller 110 checks whether the aprons 118 are tensioned, i.e. according to the signal of the sensor 158 whether the hydraulic cylinder 124 is in an appropriate position, and according to the signal of the sensor 156 whether the crop receiving means 126 are lowered and according to an information from the tractor controller 60, whether the PTO shaft 56 is rotating. If any of these conditions are not fulfilled, an error message is given to the operator in step 240. It would also be possible to let the baler controller 110 actuate the involved actuators to bring the respective elements automatically into a working position.

On the other hand, when all conditions in step 238 are fulfilled, step 242 is performed in which a resume baling operation message is displayed and/or acoustically brought to the attention of the operator. In the next step 244, the baler controller 110 awaits a resume baling operation signal from the operator which can be input by means of the keyboard 90. If this message is not received, e.g. when the operator is not prepared to continue baling, since he is having a rest or wants to drive the tractor 10 to another location, step 244 is performed again. If the resume baling operation signal is received, the baling operation is resumed in step 246 in which the tractor 10 is accelerated to the last speed it had before step 208. After step 246, step 206 is performed again.

In case that an error message is displayed (steps 232, 236 and 240) or acoustically brought to the attention of the operator, the operator can check the situation, if necessary take steps to resolve possible problems and once they are resolved, input a corresponding confirmation to the baler controller 110 via the keyboard 90. Control then continues with the previous steps (228, 234 or 238) that led to the error message.

In a possible embodiment, steps 234 to 244 could also be inserted into the flow diagram of FIG. 3 between steps 204 and 206, in order to have an automatic check of the baler 12 status already before the first bale is baled. The confirmation signals in steps 222 and 244 could also be input by the operator via any other suitable means, for example a confirmation key on a joystick or on the hand throttle lever 70. The described automatic operation makes control of the baler 12 significantly easier for the operator, since a number of processes are performed automatically. Any significant action of the operator on a brake pedal, the gas pedal 16, an emergency push button, or the hand throttle lever 70 would disable the automatic baling operation and halt all functions.

Automatic Steering Operation

In order to make work for the operator even easier, a second aspect of the present invention is directed towards an automatic steering operation of the tractor 10 during the baling operation. The steering operation described is additionally attempting to obtain an exactly cylindrical shape of the bale.

The steering operation is performed by the tractor controller 60 using the video signal from the camera 160 and the signals from the bale size sensors 144 that are provided to the tractor controller 60 by the baler controller 110. The camera 160 could be replaced or supplemented by two swath position sensors 162 detecting independently the position of the edges of the swath 130 installed on each side of the tractor 10. These sensors are in an embodiment mounted below the tractor sides and measure the lateral distance to the vertical flanges of the swath, for example using ultrasound. In another embodiment, the tractor 10 could be provided with a GPS antenna receiving position data and a memory in which the position of the swath 130 that is known from previous working (swathing) operations is stored. The tractor 10 could then be steered such that the actual tractor position data provided by the GPS antenna and the swath position data from the memory match. Steering data could also be calculated by the baler processor 110 or by a separate steering processor not shown.

The tractor controller 60 is via an electromagnetic valve assembly 166 also connected to a steering cylinder 164 that controls the steering angle of the front wheels 20.

Figure 4:
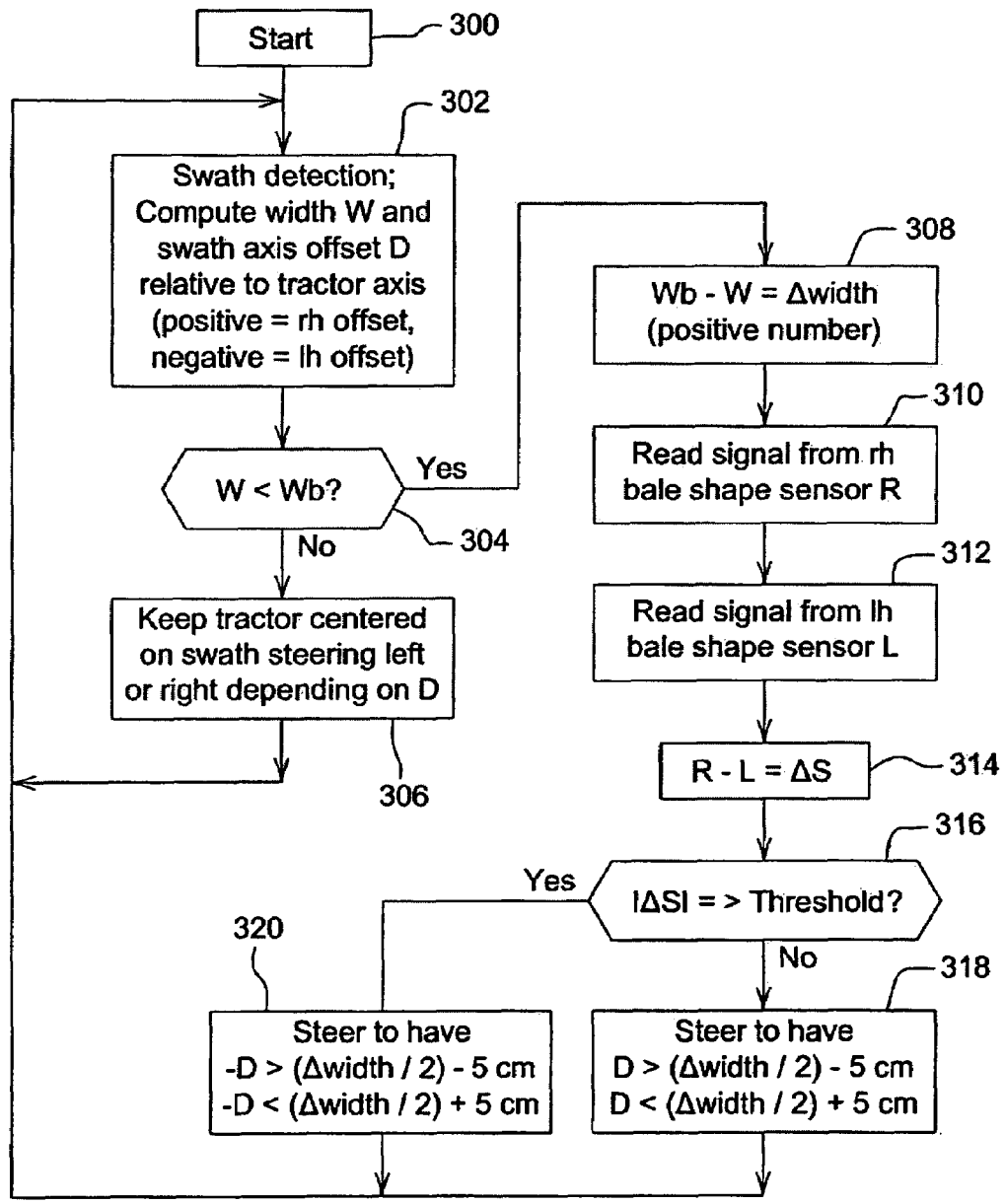

The steering operation is controlled according to a process schematically indicated in the flow chart of FIG. 4. After start in step 300, the width W of the swath and the offset D of the center axis of the swath from the center axis of the tractor 10 is calculated in step 302, using the signals of the camera 160 processed in an image processing system provided inside of or external to the tractor controller 60 and/or from the swath position sensors 162, or from the GPS antenna and the memory.

in step 304, it is checked whether the width W of the swath is smaller than the width Wb of the baling chamber 112. If this is not the case, i.e. the baler has the same width as the swath or even less, the tractor is then in step 306 steered left or right dependent on the offset D to keep centered on the swath 130. Step 302 follows upon step 306.

On the other hand, if according to step 304 the swath width is smaller than the width of the baling chamber 112, step 308 is executed, in which a value Δwidth is calculated that corresponds to the absolute value of the difference between the width of the baling chamber 112 and the width of the swath 130. In step 310, the tractor controller 60 reads a signal from the right bale size sensor 144 and in step 312, it reads a signal from the left bale size sensor 144. Information on a bale shape deviation ΔS from a cylindrical shape is calculated in step 314 by subtracting the two bale size values from the sensors 144 from steps 310 and 312.

If the absolute value of the bale shape deviation ΔS is not larger than a predetermined threshold, what is checked in step 316, step 318 is performed. In step 318, the steering cylinder 164 is controlled such that the offset D gets larger than Δwidth/2−5 cm and smaller than Δwidth/2+5 cm. Of course the border limits of the offset D can be also fine-tuned by taking in account the width of the crop receiving means. Since D is positive, the tractor 10 is steered to the left side of the swath 130. In an example, if W=70 cm, Wb=120 cm, Δwidth would be 50 cm, such that the tractor controller 60 would attempt to get D between 20 and 30 cm, thus steer the tractor to the left such that the swath 130 is offset to the right from the tractor axis by 20 to 30 cm.

If on the other hand in step 316 the bale shape deviation is larger than the predetermined threshold, step 320 is executed, according to which the steering cylinder 164 is controlled such that the offset −D gets larger than Δwidth/2−5 cm and smaller than Δwidth/2+5 cm. Now the tractor 10 is steered to the right, such that it gets to the left side of the swath, since D is negative. With the figures from the example above, the tractor 10 would be steered 20 to 30 cm to the right side of the swath 130. After steps 318 and 320, step 302 is performed again.

The tractor is thus steered in relatively large curves along the swath 130 such that the swath 130 enters alternatingly close to the left and right end of the crop receiving means 126 in order to obtain a cylindrical bale shape, but no crop is left on the field.

When also the signals provided by the center bale size sensor 144 would be considered, one could in step 316 calculate whether the bale is barrel shaped (i.e. the bale has a larger diameter in the center than at its edges) and if this is true, increase the offset D to a value larger than Δwidth/2+5 cm and smaller than Δwidth/2+15 cm. The offset can however not be increased too much because the tractor wheels 20, 22 would then ride on the swath 130. If the bale is hour-glass shaped (i.e. the bale has a smaller diameter in the center than at its edges), the offset width would be reduced to lie between Δwidth/2−15 cm and smaller than Δwidth/2−5 cm.

The tractor controller 60 could also check whether the swath 130 is curved, and when this is the case, adjust the offset D accordingly, by increasing positive values and decreasing negative values when turning right and the opposite when turning left.

When the bale size approaches the desired (first) size, the threshold for the bale shape signal ΔS could be reduced according to a rule based on how fast ΔS has been varying during bale formation, in order to achieve a perfectly cylindrical bale.

If the tractor controller 60 would not be able to compute a satisfactory information about the swath 130, the operator would be warned acoustically and/or via a message shown on display device 94 that he has to steer on his own, and preferably the tractor 10 would also halt automatically unless the operator takes over steering. Any significant action on the steering wheel 30 would also disable the automatic steering function.

Having described the preferred embodiment, it will become apparent that various modifications can be made without departing from the scope of the invention as defined in the accompanying claims.

The invention claimed is:

1. A combination of a tractor and a baler, wherein
 the tractor comprises: a tractor frame, ground engaging means supporting the tractor frame upon the ground, steering means for steering the tractor and an electronic tractor steering controller operable to control the steering means,
 the baler comprises: a baler frame coupled or connected to the tractor frame, a crop receiving means supported on the baler frame for receiving crop from a field, a baling chamber supported on the baler frame for pressing crop received by the crop receiving means to a bale, a bale shape sensor associated with the baling chamber for detecting the shape of a bale within the baling chamber, and an electronic baler controller connected to the bale shape sensor, the baler controller connected to the steering controller;
 wherein the steering controller is connected to a swath position sensor and considers a width of the swath and a width of the baling chamber operable to automatically steer the tractor along a swath based upon the signals of the crop swath sensor and of the bale shape sensor and is operable to adjust an offset between a center axis of the swath from a center axis of the tractor according to a curvature of the swath such that a uniform bale shape is obtained.

2. A combination according to claim 1, wherein the swath position sensor comprises a camera viewing upon the swath, the camera providing a video signal to the steering controller that is processed in an image processing system provided inside of or external to the steering controller to provide an electronic indication about the location of the tractor with respect to the swath.

3. A combination according to claim 1, wherein the swath position sensor measures the lateral distance to vertical flanges of the swath.

4. A combination according to claim 1, wherein the bale shape sensors comprise a plurality of bale size sensors distributed across the width of the bale.

5. A combination according to claim 1, wherein the steering controller is operable to steer the tractor such that the swath enters in an alternating manner close to a left and a right end of the crop receiving means.

6. A combination according to claim 1, wherein the steering controller is operable to steer the tractor to a side with a smaller bale size once a difference between the difference between the size of the bale on one side thereof and the size of the bale on the other side thereof is larger than a threshold.

* * * * *